(12) United States Patent
Harada et al.

(10) Patent No.: US 11,175,391 B2
(45) Date of Patent: Nov. 16, 2021

(54) OBJECT DETECTION DEVICE

(71) Applicant: DENSO CORPORATION, Kariya (JP)

(72) Inventors: Taketo Harada, Nisshin (JP);
Mitsuyasu Matsuura, Nisshin (JP); Yu Koyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 316 days.

(21) Appl. No.: 16/332,531

(22) PCT Filed: Aug. 3, 2017

(86) PCT No.: PCT/JP2017/028282
§ 371 (c)(1),
(2) Date: Mar. 12, 2019

(87) PCT Pub. No.: WO2018/051669
PCT Pub. Date: Mar. 22, 2018

(65) Prior Publication Data
US 2019/0204428 A1 Jul. 4, 2019

(30) Foreign Application Priority Data
Sep. 14, 2016 (JP) .............................. JP2016-179866

(51) Int. Cl.
*G01S 7/52* (2006.01)
*G01S 7/526* (2006.01)
(Continued)

(52) U.S. Cl.
CPC .......... *G01S 7/52004* (2013.01); *B60Q 5/005* (2013.01); *G01S 7/526* (2013.01);
(Continued)

(58) Field of Classification Search
None
See application file for complete search history.

(56) References Cited

U.S. PATENT DOCUMENTS

2002/0023498 A1* 2/2002 Tsuzuki ................. G01N 29/12
73/617
2002/0047780 A1* 4/2002 Nishimoto .......... G01S 7/52004
340/540
(Continued)

FOREIGN PATENT DOCUMENTS

JP 2000-304860 A 11/2000
JP 2002-131428 A 5/2002
(Continued)

*Primary Examiner* — Hovhannes Baghdasaryan
(74) *Attorney, Agent, or Firm* — Maschoff Brennan

(57) ABSTRACT

An ECU of an object detection device stops transmission of search waves from a plurality of ultrasonic sensors when a vehicle travels at a predetermined speed or more, and counts the frequency of receiving waves with an intensity of not less than a threshold intensity for each of the plurality of ultrasonic sensors. The ECU acquires a first count that is a count of the frequency in a first sensor that is one of the plurality of ultrasonic sensors, and a second count that is a count of the frequency in a second sensor different from the first sensor. The ECU determines that snow accretion has occurred on the first sensor if the first count is smaller than the second count, and a difference between the first count and a representative value that is set based on the second count is not less than a predetermined value.

9 Claims, 8 Drawing Sheets

(51) Int. Cl.
  *G01S 15/87* (2006.01)
  *B60Q 5/00* (2006.01)
  *G01S 15/931* (2020.01)
  *G01S 7/539* (2006.01)

(52) U.S. Cl.
  CPC ............ *G01S 15/87* (2013.01); *G01S 15/931* (2013.01); *G01S 7/539* (2013.01); *G01S 2007/52009* (2013.01); *G01S 2015/938* (2013.01)

(56) References Cited

U.S. PATENT DOCUMENTS

| | | | |
|---|---|---|---|
| 2009/0207006 A1* | 8/2009 | Richter | G01S 7/52004 340/435 |
| 2009/0207079 A1 | 8/2009 | Samukawa et al. | |
| 2011/0241858 A1 | 10/2011 | Tsuzuki | |
| 2012/0020188 A1* | 1/2012 | Mielenz | G01S 7/521 367/99 |
| 2016/0223658 A1* | 8/2016 | Hallek | G01S 7/52004 |
| 2016/0291153 A1* | 10/2016 | Mossau | G01S 7/56 |
| 2017/0254888 A1 | 9/2017 | Tsuzuki et al. | |

FOREIGN PATENT DOCUMENTS

| | | |
|---|---|---|
| JP | 2009-192422 A | 8/2009 |
| JP | 2011-215002 A | 10/2011 |
| JP | 2016-050881 A | 4/2016 |

* cited by examiner

OBJECT DETECTION DEVICE

CROSS-REFERENCE TO RELATED APPLICATION

The present application is a national stage application of PCT Application No. PCT/JP2017/028282, filed on Aug. 3, 2017, which claims the benefit of priority from earlier Japanese Patent Application No. 2016-179866 filed Sep. 14, 2016, the description of which is incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to an ultrasonic object detection device installed in vehicles.

BACKGROUND ART

Object detection devices for vehicles using ultrasonic sensors are well known. This type of devices may have trouble in object detection if foreign matter adheres to the surface of an ultrasonic sensor. In particular, if the foreign matter that has adhered is snow that absorbs ultrasonic waves well, object detection will be difficult. In this regard, the device disclosed in JP 2011-215002 A determines adhesion of snow if predetermined conditions (e.g., vehicle speed being 15 km/h or more and less than 30 km/h) are met, and the reverberated waves received by the ultrasonic sensor have a wavelength of not less than a threshold.

SUMMARY OF THE INVENTION

As is apparent from the above, a much better way of determining adhesion of foreign matter is sought in this type of object detection devices to accomplish object detection well. In particular, snow has high absorbency to ultrasonic waves. Therefore, it is crucial for this type of object detection devices to much more improve accuracy of determining the occurrence of snow accretion.

According to an aspect of the present disclosure, an object detection device includes a control unit and a plurality of ultrasonic sensors. The plurality of ultrasonic sensors are disposed so as to be exposed from the outer surface of a vehicle to transmit ultrasonic waves, or search waves, toward the outside of the vehicle, and receive waves including reflected waves of the search waves. The control unit is electrically connected to the plurality of ultrasonic sensors so as to control transmission and non-transmission of the search waves from the plurality of ultrasonic sensors, and detect approach of an object to the vehicle, based on the waves received in the plurality of ultrasonic sensors.

The control unit is configured to operate as follows. Specifically, the control unit starts an adhesion determination mode with which the occurrence of snow accretion is determined, for each of the plurality of ultrasonic sensors when the traveling speed of the vehicle is not less than a predetermined speed. In the adhesion determination mode, the control unit stops transmission of the search waves from the plurality of ultrasonic sensors. The control unit counts the frequency of receiving the waves with an intensity of not less than a threshold intensity, for each of the plurality of sensors while transmission of the search waves is stopped. The control unit acquires a first count that is a count of the frequency in a first sensor that is one of the plurality of ultrasonic sensors, and a second count that is a count of the frequency in a second sensor different from the first sensor, among the plurality of ultrasonic sensors. The control unit determines that snow accretion has occurred on the first sensor if the first count is smaller than the second count, and a difference between the first count and a representative value that is set based on the second count is not less than a predetermined value.

It should be noted that the bracketed reference signs of the means recited in the claims indicate an example of correspondence to the specific means described in the embodiments given below.

DESCRIPTION OF THE EMBODIMENTS

With reference to the drawings, an embodiment will be described. The components identical with or equivalent to each other between the embodiment and each modification thereof described later are given the same reference signs. As long as there is no technical contradiction, the preceding embodiment may be appropriately referred to in the modifications described later.

(Configuration)

Figure 1:
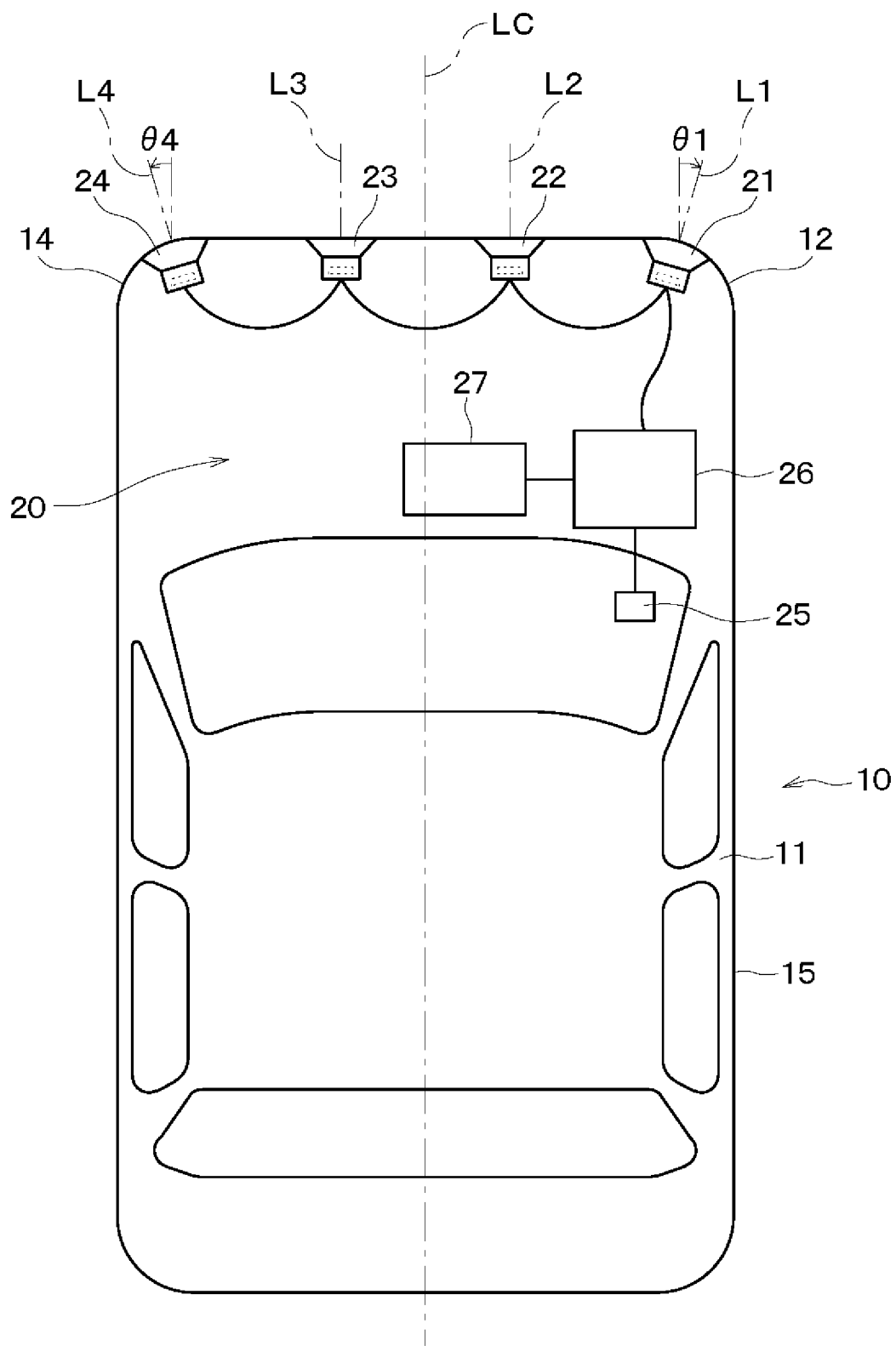
FIG. 1 is a schematic diagram illustrating a configuration of a vehicle equipped with an object detection device according to an embodiment.
Figure 2:
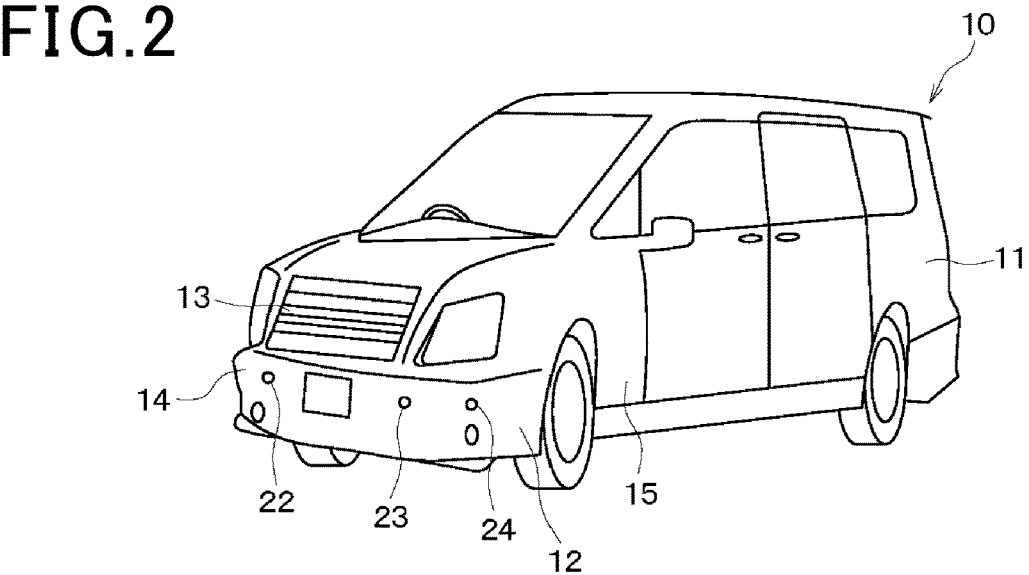
FIG. 2 is a perspective view illustrating an appearance of the vehicle illustrated in FIG. 1.

FIGS. 1 and 2 show a vehicle 10, which is a four-wheel vehicle, including a substantially rectangular vehicle body 11 in plan view. The vehicle body 11 has a front end part to which a front bumper 12 and a front grille 13 are mounted. In the following description, a direction perpendicular to a vertical direction (i.e. gravity acting direction) or a vehicle center line LC is referred to as a vehicle width direction. In FIG. 1, the vehicle width direction corresponds to the left to right direction as viewed in the figure. It should be noted that the vehicle width direction is substantially parallel to the rotational axis of the non-steered wheels (e.g., rear wheels), not shown.

As shown in FIG. 2, the front grille 13 is disposed above the front bumper 12. The front bumper 12 has a front face that is an outer bumper face 14 configuring part of an outer surface 15 of the vehicle 10. The outer bumper face 14 is disposed so as to be exposed in the forward direction, i.e., the traveling direction of the vehicle (upward as viewed in FIG. 1).

The vehicle 10 is equipped with an object detection device 20. The object detection device 20 includes ultrasonic sensors 21 to 24, a vehicle speed sensor 25, an ECU 26, and a notification unit 27. The ultrasonic sensors 21 to 24 are disposed so as to be exposed from the outer surface 15 of the vehicle 10 to transmit ultrasonic waves, or search waves, toward the outside of the vehicle 10, and receive waves including reflected waves of the search waves. In the present embodiment, the ultrasonic sensors 21 to 24 are disposed on the front face of the vehicle 10. Specifically, the ultrasonic sensors 21 to 24 are mounted to the front bumper 12 so as to be exposed from the outer bumper face 14. Specifically, the ultrasonic sensors 21 to 24 are so provided to ensure transmission of search waves in the forward direction of the vehicle 10.

The ultrasonic sensors 21, 22, 23 and 24 are arrayed in this order along the vehicle width direction. Specifically, the ultrasonic sensor 21 is provided to the right corner of the front bumper 12 relative to when the driver, not shown, views ahead of the vehicle 10 from inside the vehicle. Specifically, when the vehicle traveling direction is taken to be the up and down direction in plan view, the ultrasonic sensor 21 is disposed at the upper right corner of the vehicle 10. The ultrasonic sensor 22 is disposed, in plan view, between the vehicle center line LC and the ultrasonic sensor 21. The ultrasonic sensor 23 is disposed, in plan view, between the vehicle center line LC and the ultrasonic sensor 24. The ultrasonic sensor 24 is provided to the left corner of the front bumper 12 relative to when the driver, not shown, views ahead of the vehicle 10 from inside the vehicle. The ultrasonic sensors 21 and 24 are line symmetrically disposed, in plan view, about the vehicle center line LC. The ultrasonic sensors 22 and 23 are line symmetrically disposed, in plan view, about the vehicle center line LC.

The ultrasonic sensors 21, 22, 23 and 24 are mounted to the vehicle 10 so that the mounting conditions will be different therebetween. The mounting conditions include not only a mounting position in plan view, but also a mounting level, a horizontal mounting angle, and a mounting elevation angle. The meaning of the terms set forth above will be described, taking the ultrasonic sensor 21 as an example.

First, as a precondition for describing the meaning of the terms, a directional center axis L1 of the ultrasonic sensor 21 will be described. The directional center axis L1 is an axis that maximizes the sound pressure of search waves in a directional angle of the ultrasonic sensor 21, and typically corresponds to a structural center axis of the ultrasonic sensor 21. As is apparent from the definition, the directional center axis L1 is formed in the forward direction than the ultrasonic sensor 21 (i.e. on a transmitted side of search waves). FIG. 1 shows directional center axes L1, L2, L3 and L4 of the ultrasonic sensors 21, 22, 23 and 24, respectively.

The mounting level of the ultrasonic sensor 21 corresponds to the level (i.e., position in the vertical direction) of the directional center axis L1 of the ultrasonic sensor 21 from the grounding surface of the vehicle. The horizontal mounting angle of the ultrasonic sensor 21 corresponds to an angle of the directional center axis L1 of the ultrasonic sensor 21, in plan view, relative to the vehicle center line LC (i.e., θ1 in FIG. 1). As shown in FIG. 1, the horizontal mounting angle θ1 will have a positive sign when the directional center axis L1 rotates clockwise relative to the vehicle center line CL. The mounting elevational angle of the ultrasonic sensor 21 corresponds to an elevation angle, in side view, of the directional center axis L1 of the ultrasonic sensor 21 relative to the vehicle center line LC. As is apparent from the definition, the mounting elevation angle will have a positive sign when the directional center axis L1 is above the vehicle center line LC.

In the present embodiment, the ultrasonic sensor 21 is provided so that the horizontal mounting angle θ1 will have a positive value. The ultrasonic sensor 22 is provided so that the horizontal mounting angle θ2 will have a positive value that is 0 or smaller than θ1. The ultrasonic sensor 23 is provided so that the horizontal mounting angle θ3 will be 0 or −θ2. The ultrasonic sensor 24 is provided so that the horizontal mounting angle θ4 will be −θ1. It should be noted that θ2 and θ3 are omitted in FIG. 1 for simplification.

The vehicle speed sensor 25 generates electrical output (e.g., voltage) corresponding to the traveling speed of the vehicle 10. The ultrasonic sensors 21 to 24 and the vehicle speed sensor 25 are electrically connected to the ECU 26. The term ECU stands for electric control unit.

The ECU 26 is an in-vehicle microcomputer including a CPU, a ROM, a RAM, a nonvolatile RAM (e.g., flash ROM), and the like, none of which are shown. Specifically, the ECU 26 is configured to allow the CPU to read a program from the ROM or the nonvolatile RAM for execution of the program to thereby accomplish various control operations.

The ECU 26, which corresponds to the control unit, is configured to control transmission or non-transmission of search waves from the individual ultrasonic sensors 21 to 24. Furthermore, the ECU 26 is configured to detect approach of an object toward the vehicle 10 (i.e., to detect the presence of an approaching object and the distance to the approaching object), based on waves received in the individual ultrasonic sensors 21 to 24.

The vehicle 10 is also equipped with the notification unit 27. The notification unit 27 is electrically connected to the ECU 26 to issue an alarm about the occurrence of a failure in the case where snow accretion is determined to have occurred at least in one of the ultrasonic sensors 21 to 24.

(Overview of Operation)

The following description addresses an overview of the operation of the object detection device 20. The ECU 26 starts an adhesion determination mode with which the occurrence of snow accretion is determined for the individual ultrasonic sensors 21 to 24 when the traveling speed of the vehicle 10 is not less than a predetermined speed. In the adhesion determination mode, the ECU 26 stops transmission of search waves from the individual ultrasonic sensors 21 to 24. Specifically, in the adhesion determination mode, the ECU 26 allows the ultrasonic sensors 21 to 24 to operate with a reception mode for receiving waves, without transmitting search waves.

In the reception mode, the ECU 26 counts the frequency of receiving waves with an intensity of not less than a threshold intensity, for each of the ultrasonic sensors 21 to 24 for a predetermined period. The value obtained by such counting is hereinafter termed a count. Specifically, the ECU 26 acquires counts respectively corresponding to the ultrasonic sensors 21, 22, 23 and 24.

The ECU 26 specifies a minimum value from among the four counts. The minimum value, which is smaller than the rest of the counts, corresponds to the first count. The ECU 26 determines a representative value from among the four counts, i.e., determines a representative value based on at least one of the three counts, excluding the smallest one. If the difference between the representative value and the minimum value is not less than a predetermined value, the ECU 26 determines whether snow accretion has occurred in a sensor corresponding to the minimum value among the ultrasonic sensors 21 to 24.

Specific Example

Referring to the flow diagrams, a description will be given of specific operation examples, and advantageous effects of the configuration according to the present embodiment. In the drawings and the following description, the term step is simply referred to as S. In addition, the CPU, the ROM, the RAM, and the nonvolatile RAM of the ECU 26 are simply referred to as the CPU, the ROM, the RAM, and the nonvolatile RAM.

First Operation Example

In the present operation example, the representative value is one of the three counts (e.g., the secondly small value), excluding the minimum value. The CPU, if it determines establishment of predetermined conditions, including the traveling speed of the vehicle 10 having reached a predetermined speed or more, starts the adhesion determination mode. Upon start of the adhesion determination mode, the CPU iterates an adhesion detection routine shown in FIG. 3 and a failure processing routine shown in FIG. 4 at respective predetermined cycles.

Figure 3:
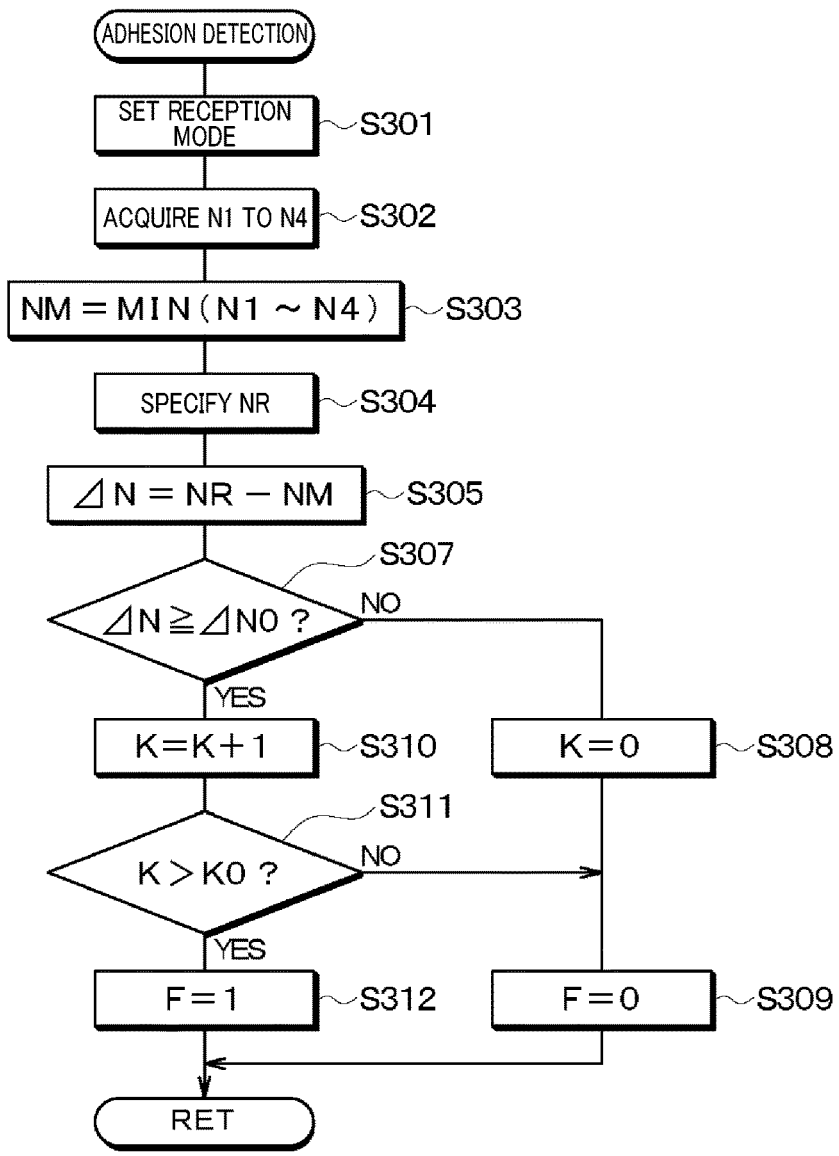
FIG. 3 is a flow diagram illustrating a first operation example of the object detection device illustrated in FIG. 1.

Upon start of the adhesion detection routine shown in FIG. 3, the CPU sets, at S301 first, the operation mode of the ultrasonic sensors 21 to 24 to a reception mode. With this setting, the ultrasonic sensors 21 to 24 stop transmission of search waves until the reception mode is cancelled.

Then, at S302, the CPU acquires a count N1 corresponding to the ultrasonic sensor 21, a count N2 corresponding to the ultrasonic sensor 22, a count N3 corresponding to the ultrasonic sensor 23, and a count N4 corresponding to the ultrasonic sensor 24. At subsequent S303, the CPU specifies a minimum value from among the counts N1 to N4. This minimum value is hereinafter termed a minimum value NM.

At S304, the CPU specifies a secondly small value, as a representative value NR, from among the counts N1 to N4. After that, the CPU calculates, at S305, a difference $\Delta N$ between the representative value NR and the minimum value NM, and then allows control to proceed to S307.

At S307, the CPU determines whether $\Delta N$ is not less than a predetermined value $\Delta N0$. If $\Delta N$ is less than the predetermined value $\Delta N0$ (i.e., NO at S307), the CPU allows control to proceed to S308 and S309, and then temporarily terminates the present routine. At S308, the CPU resets a counter K (i.e., K=0). The counter K serves as a counter for determining during which $\Delta N \geq \Delta N0$ for a predetermined period. At S309, the CPU resets a flag F (i.e., F=0). The flag F serves as a diagnosis flag and thus indicates a determination as to whether snow accretion has occurred.

If $\Delta N$ is not less than the predetermined value $\Delta N0$ (i.e., YES at S307), the CPU allows control to proceed to S310 and S311. At S310, the CPU increments the counter K by 1. At S311, the CPU determines whether the count of the counter K has exceeded a predetermined value K0. If the count of the counter K has exceeded a predetermined value K0 (i.e., YES at S311), the CPU allows control to proceed to S312, and then temporarily terminates the present routine. At S312, the CPU sets the flag F (i.e., F=1). In other words, the CPU determines whether snow accretion has occurred in a sensor corresponding to the minimum value NM among the ultrasonic sensors 21 to 24. If the count of the counter K has not exceeded the predetermined value K0 (i.e., NO at S311), the CPU allows control to proceed to S309. At S309, the CPU resets the flag F, and then temporarily terminates the present routine.

Figure 4:
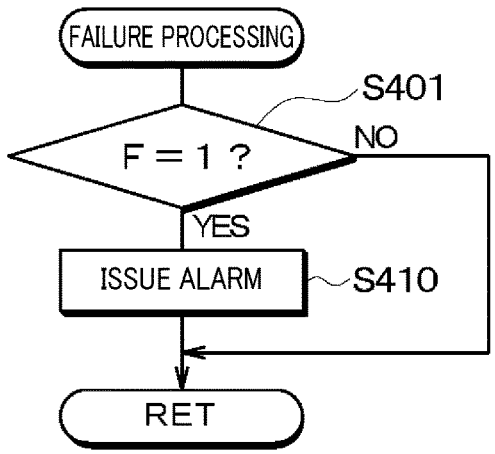
FIG. 4 is a flow diagram illustrating a first operation example of the object detection device illustrated in FIG. 1.

Upon start of the failure processing routine shown in FIG. 4, the CPU determines, at S401 first, whether the flag F has been set. If the flag F has been set (i.e., YES at S401), the CPU allows control to proceed to S410, and then temporarily terminates the present routine. At S410, the CPU controls the notification unit 27 so that the driver is notified of the occurrence of snow accretion. If the flag F has been reset (i.e., NO at S401), the CPU skips S410, and then temporarily terminates the present routine.

Snow has high absorbency to ultrasonic waves. Accordingly, in the occurrence of snow accretion in the ultrasonic sensor 21, 22, 23 or 24, transmission and reception sensitivity lowers. Therefore, if snow accretion occurs in the ultrasonic sensor 21, 22, 23 or 24, it is difficult to detect the snow accretion in a transmission and reception mode (i.e., mode of transmitting search waves and receiving waves such as with the ultrasonic sensor 21 to perform object detection).

In this regard, in the present operation example, the object detection device 20 allows, as described above, the ultrasonic sensors 21 to 24 to operate in a reception mode in the adhesion determination mode to detect noise. Specifically, the counts N1 to N4 correspond to received noise levels in the respective ultrasonic sensors 21 to 24. The term noise refers to a signal generated in each of the ultrasonic sensors 21 to 24 as the vehicle 10 travels. The noise in this case is caused due to factors other than reception of reflected waves from an approaching object (e.g., a pedestrian, another vehicle, etc.) that is an object to be detected. The noise includes, for example, noise due to collision of flying matter in the air, such as falling snow or raindrops, with the ultrasonic sensors 21 to 24. Also, the noise includes, for example, wind noise. Further, the noise includes, for example, noise due to reception of reflected waves from the ground. Furthermore, the noise includes, for example, a signal generated when one of the ultrasonic sensors 21 to 24 has received the search waves transmitted from another one of the sensors. The noise does not include electrical noise.

If the ultrasonic sensors 21 to 24 are covered with snow, the respective received noise levels will be lower. Therefore, In the present operation example, the object detection device 20 essentially uses the difference in received noise level between the plurality of ultrasonic sensors 21 to 24 of the same one vehicle 10, for detection of snow accretion. Specifically, the object detection device 20 determines snow accretion as having occurred in a sensor, if the received noise level thereof has unusually lowered, among the ultrasonic sensors 21 to 24. Thus, according to the present operation example, accuracy in snow accretion determination is further improved.

Second Operation Example

In the present operation example, two of the ultrasonic sensors 21 to 24 are used for determining snow accretion. These two sensors have a difference in horizontal mounting angle therebetween which is within a predetermined angle range. In the following description, one of the ultrasonic sensors 21 to 24 is referred to as a first sensor, and another one of them is referred to as a second sensor for the sake of convenience.

If mounting conditions are greatly different between the first and second sensors, there would also be a great difference in received noise level therebetween even in a normal state where there is no adhesion of foreign matter, such as snow. Therefore, in the present operation example, the object detection device 20 determines snow accretion using first and second sensors whose mounting conditions are approximate to each other, i.e., whose difference in horizontal mounting angle is not more than a predetermined angle. (e.g., 30 degrees). Thus, accuracy in snow accretion determination can be further improved.

When snow accretion while the vehicle is parked for a long time is assumed, snow accretion would be only local depending on the parking environment. In this case, a better snow accretion determination would be made by using first and second sensors located at positions distanced from each other in plan view. Therefore, in the present operation example, the object detection device 20 determines snow accretion using first and second sensors whose difference in horizontal mounting angle is not less than a predetermined angle (e.g., 50 degrees). Thus, accuracy in snow accretion determination can be further improved.

In the present operation example, either one of the above two examples associated with difference in horizontal mounting angle may be used, depending on the contour or the like of the vehicle 11. Alternatively, the above two examples may be used in combination.

Details of the present operation example will be described. Upon start of the adhesion determination mode, the CPU iterates an adhesion detection routine shown in FIG. 5 and the failure processing routine shown in FIG. 4 at respective predetermined cycles. Since the failure processing routine shown in FIG. 4 is similar to that of the first operation example, description is omitted.

Figure 5:
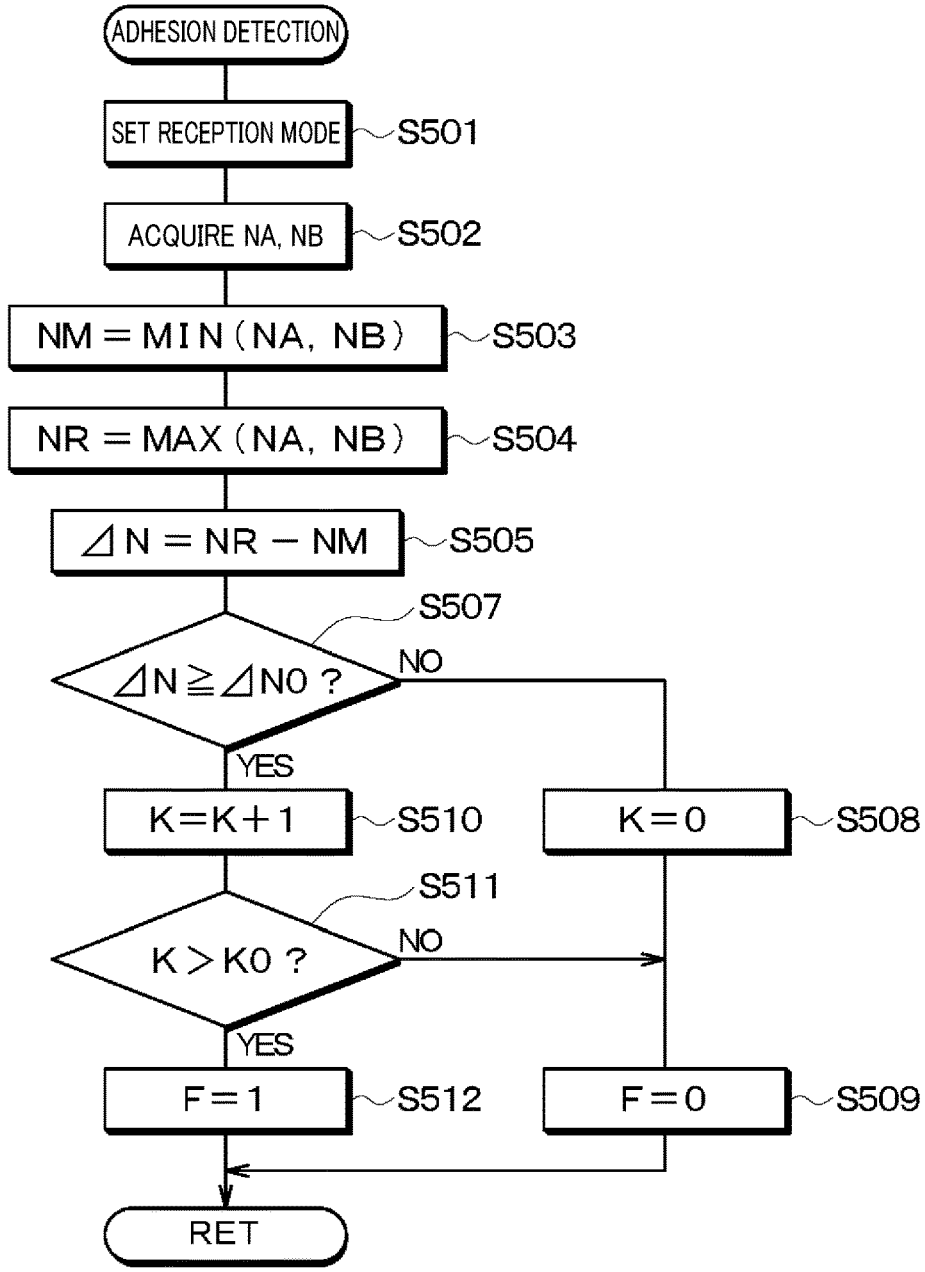
FIG. 5 is a flow diagram illustrating a second operation example of the object detection device illustrated in FIG. 1.

Upon start of the adhesion detection routine shown in FIG. 5, the CPU sets, at S501 first, the operation mode of the ultrasonic sensors 21 to 24 to a reception mode. Then, at S502, the CPU acquires counts NA and NB respectively corresponding to first and second sensors selected as described above. At the subsequent S503, the CPU specifies the count NA or the count NB, whichever is smaller, as a minimum value NM. At S504, the CPU specifies the count NA or the count NB, whichever is larger, as a representative value NR. After that, the CPU calculates, at S505, a difference ΔN between the representative value NR and the minimum value NM, and then allows control to proceed to S507.

At S507, the CPU determines whether ΔN is not less than a predetermined value ΔN0. If ΔN is less than the predetermined value ΔN0 (i.e., NO at S507), the CPU allows control to proceed to S508 and S509, and then temporarily terminates the present routine. At S508, the CPU resets the counter K (i.e., K=0). At S509, the CPU resets the flag F (i.e., F=0).

If ΔN is not less than the predetermined value ΔN0 (i.e., YES at S507), the CPU allows control to proceed to S510 and S511. At S510, the CPU increments the counter K by 1. At S511, the CPU determines whether the count of the counter K has exceeded a predetermined value K0. If the count of the counter K has exceeded a predetermined value K0 (i.e., YES at S511), the CPU allows control to proceed to S512, and then temporarily terminates the present routine. At S512, the CPU sets the flag F (i.e., F=1). If the count of the counter K has not exceeded the predetermined value K0 (i.e., NO at S511), the CPU allows control to proceed to S509. At S509, the CPU resets the flag F, and then temporarily terminates the present routine.

Third Operation Example

The present operation example is a partial modification of the first operation example. Specifically, in the present operation example, a predetermined value ΔN0 is set, according to the difference in mounting conditions between a first sensor corresponding a minimum value NM and a second sensor corresponding to a representative value NR. More specifically, in the present operation example, the object detection device 20 assigns weights to the determination of the count difference, according to the difference in mounting conditions. Details of the present operation example will be described. Upon start of the adhesion determination mode, the CPU iterates an adhesion detection routine shown in FIG. 6 and the failure processing routine shown in FIG. 4 at respective predetermined cycles.

Figure 6:
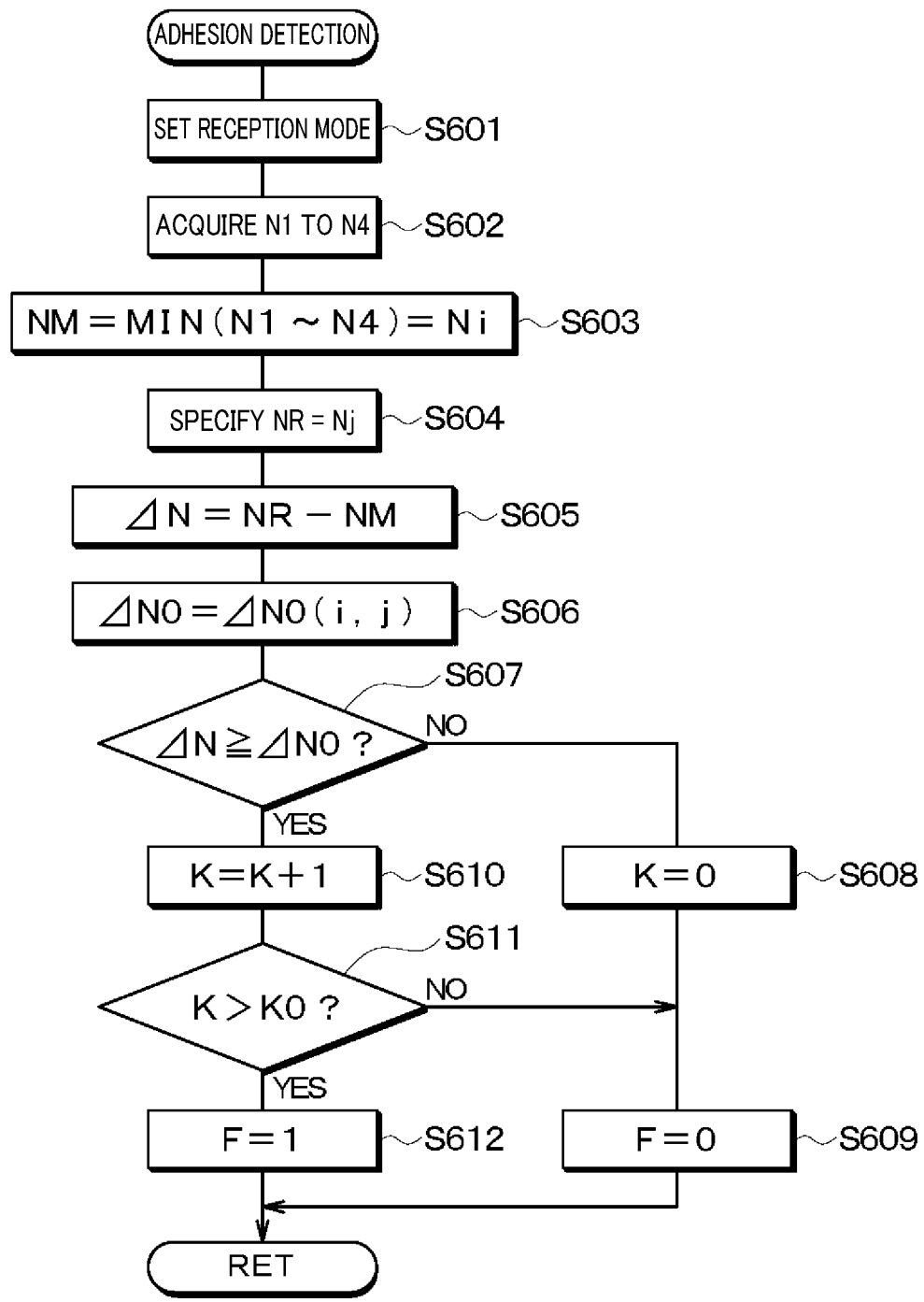
FIG. 6 is a flow diagram illustrating a third operation example of the object detection device illustrated in FIG. 1.

Upon start of the adhesion detection routine shown in FIG. 6, the CPU sets, at S601 first, the operation mode of the ultrasonic sensors 21 to 24 to a reception mode. Then, at S602, the CPU acquires counts N1 to N4.

At subsequent S603, the CPU specifies a minimum value NM from among the counts N1 to N4. Also, at S603, the CPU specifies which one of the counts N1 to N4 the minimum value NM corresponds to (i.e., which one of the ultrasonic sensors 21 to 24 corresponds to the minimum value NM). In other words, the CPU specifies the value of i for minimum value NM=Ni (i is any one of integers 1 to 4), and stores the value in the RAM.

At the subsequent S604, the CPU specifies a secondly small value from among the counts N1 to N4 as a representative value NR. Also, at S604, the CPU specifies which one of the counts N1 to N4 the representative value NR corresponds to (i.e., which one of the ultrasonic sensors 21 to 24 corresponds to the representative value NR). In other words, the CPU specifies the value of j for representative value NR=Nj (j is any one of integers 1 to 4, however i≠j), and stores the value in the RAM.

After that, the CPU calculates, at S605, a difference ΔN between the representative value NR and the minimum value NM, and then allows control to proceed to S606. At S606, the CPU sets a predetermined value ΔN0, based on the values i and j stored in the RAM, and a lookup table ΔN0 (i, j) stored in advance in the ROM or the nonvolatile RAM. The lookup table ΔN0 (i, j) includes i and j as parameters, and is used for selecting the value of ΔN0, based on the values of i and j. Specifically, the lookup table ΔN0 (i, j) is prepared based on conformance tests or other tests so that the value of ΔN0 becomes smaller as the mounting conditions become more approximate to each other. After setting the predetermined value ΔN0, the CPU allows control to proceed to S607.

At S607, the CPU determines whether ΔN is not less than the predetermined value ΔN0. If ΔN is less than the predetermined value ΔN0 (i.e., NO at S607), the CPU allows control to proceed to S608 and S609, and then temporarily terminates the present routine. At S608, the CPU resets the counter K (i.e., K=0). At S609, the CPU resets the flag F (i.e., F=0).

If ΔN is not less than the predetermined value ΔN0 (i.e., YES at S607), the CPU allows control to proceed to S610 and S611. At S610, the CPU increments the counter K by 1. At S611, the CPU determines whether the count of the counter K has exceeded a predetermined value K0. If the count of the counter K has exceeded a predetermined value K0 (i.e., YES at S611), the CPU allows control to proceed to S612, and then temporarily terminates the present routine. At S612, the CPU sets the flag F (i.e., F=1). If the count of the counter K has not exceeded the predetermined value K0 (i.e., NO at S611), the CPU allows control to proceed to S609. At S609, the CPU resets the flag F, and then temporarily terminates the present routine.

As described above, in the present operation example, a predetermined value ΔN0 is set, according to the difference in mounting conditions between a first sensor corresponding a minimum value NM and a second sensor corresponding to a representative value NR. Thus, determination of the count difference is weighted according to the difference in mounting conditions. In this way, much better snow accretion determination can be made according to the present operation example.

Fourth Operation Example

The present operation example is a partial modification of the first operation example. Specifically, in the present operation example, a notification process is prevented from being immediately executed by the notification unit 27 if the difference between a count and a representative value is not less than a predetermined value. The count in this case is of any one of the ultrasonic sensors 21 to 24 (termed a specific sensor hereinafter in the present operation example). In this case, in the present operation example, reception conditions of the specific sensor are changed and the adhesion detection routine is performed once again. Specifically, in the present operation example, the specific sensor where snow accretion is determined to have occurred is again examined for snow accretion by changing the reception conditions. If the snow accretion determination is not overturned with the change of reception conditions, the occurrence of snow accretion is formally determined, and then a notification process is performed by the notification unit 27.

Details of the present operation example will be described. Upon start of the adhesion determination mode, the CPU iterates an adhesion detection routine shown in FIG. 7 and a failure processing routine shown in FIG. 8 at respective predetermined cycles.

Figure 7:
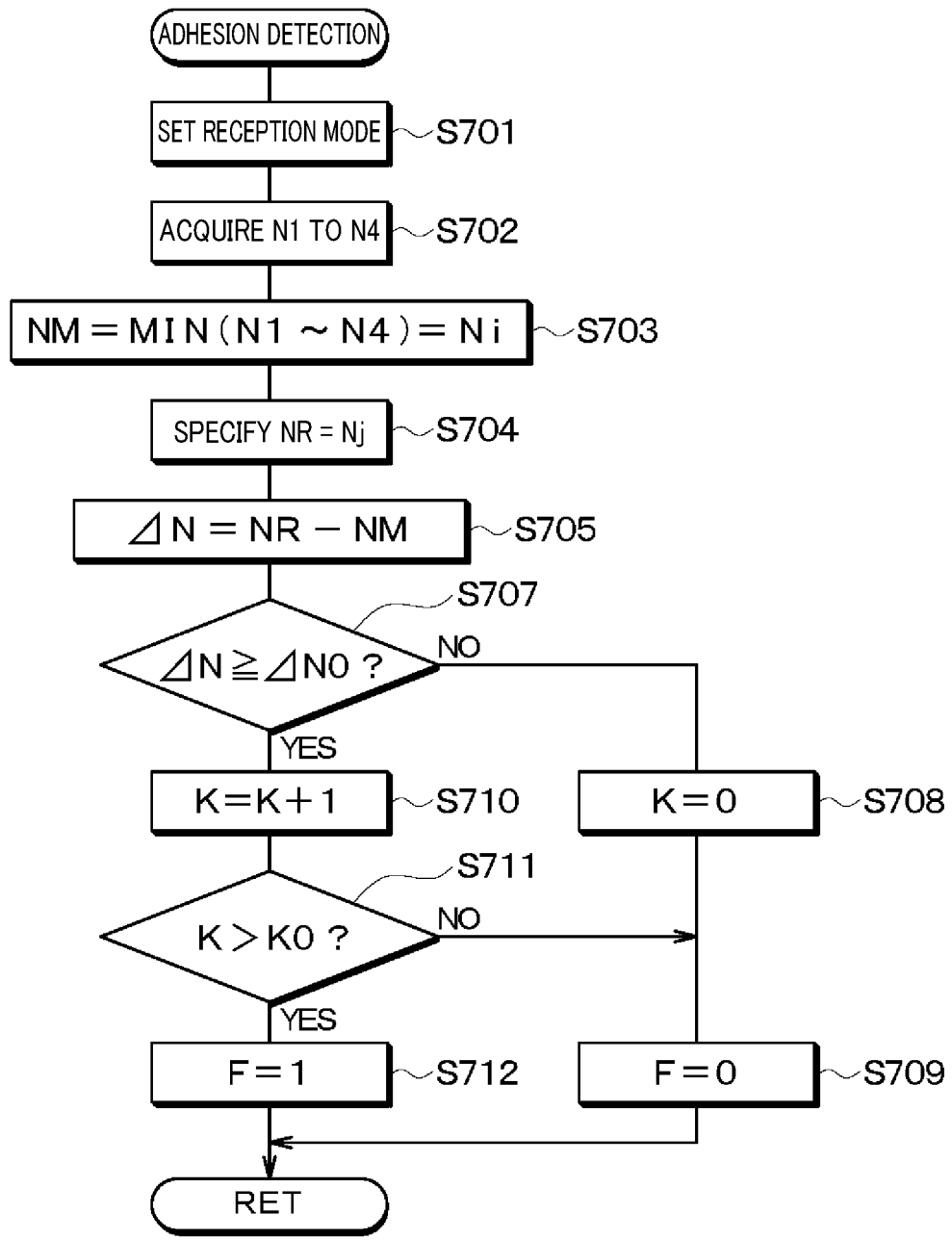
FIG. 7 is a flow diagram illustrating a fourth operation example of the object detection device illustrated in FIG. 1.

Upon start of the adhesion detection routine shown in FIG. 7, the CPU sets, at S701 first, the operation mode of the ultrasonic sensors 21 to 24 to a reception mode. Then, at S702, the CPU acquires counts N1 to N4.

At subsequent S703, the CPU specifies a minimum value NM from among the counts N1 to N4. Also, at S703, the CPU specifies the value of i for minimum value NM=Ni (i is any one of integers 1 to 4), and stores the value in the RAM.

At the subsequent S704, the CPU specifies a secondly small value from among the counts N1 to N4 as a representative value NR. Further, at S704, the CPU specifies the value of j for representative value NR=Nj (j is any one of integers 1 to 4, however i≠j), and stores the value in the RAM. After that, the CPU calculates, at S705, a difference ΔN between the representative value NR and the minimum value NM, and then allows control to proceed to S707.

At S707, the CPU determines whether ΔN is not less than a predetermined value ΔN0. If ΔN is less than the predetermined value ΔN0 (i.e., NO at S707), the CPU allows control to proceed to S708 and S709, and then temporarily terminates the present routine. At S708, the CPU resets the counter K (i.e., K=0). At S709, the CPU resets the flag F (i.e., F=0).

If ΔN is not less than the predetermined value ΔN0 (i.e., YES at S707), the CPU allows control to proceed to S710 and S711. At S710, the CPU increments the counter K by 1. At S711, the CPU determines whether the count of the counter K has exceeded a predetermined value K0. If the count of the counter K has exceeded a predetermined value K0 (i.e., YES at S711), the CPU allows control to proceed to S712, and then temporarily terminates the present routine.

At S712, the CPU sets the flag F (i.e., F=1). If the count of the counter K has not exceeded the predetermined value K0 (i.e., NO at S711), the CPU allows control to proceed to S709. At S709, the CPU resets the flag F, and then temporarily terminates the present routine.

Figure 8:
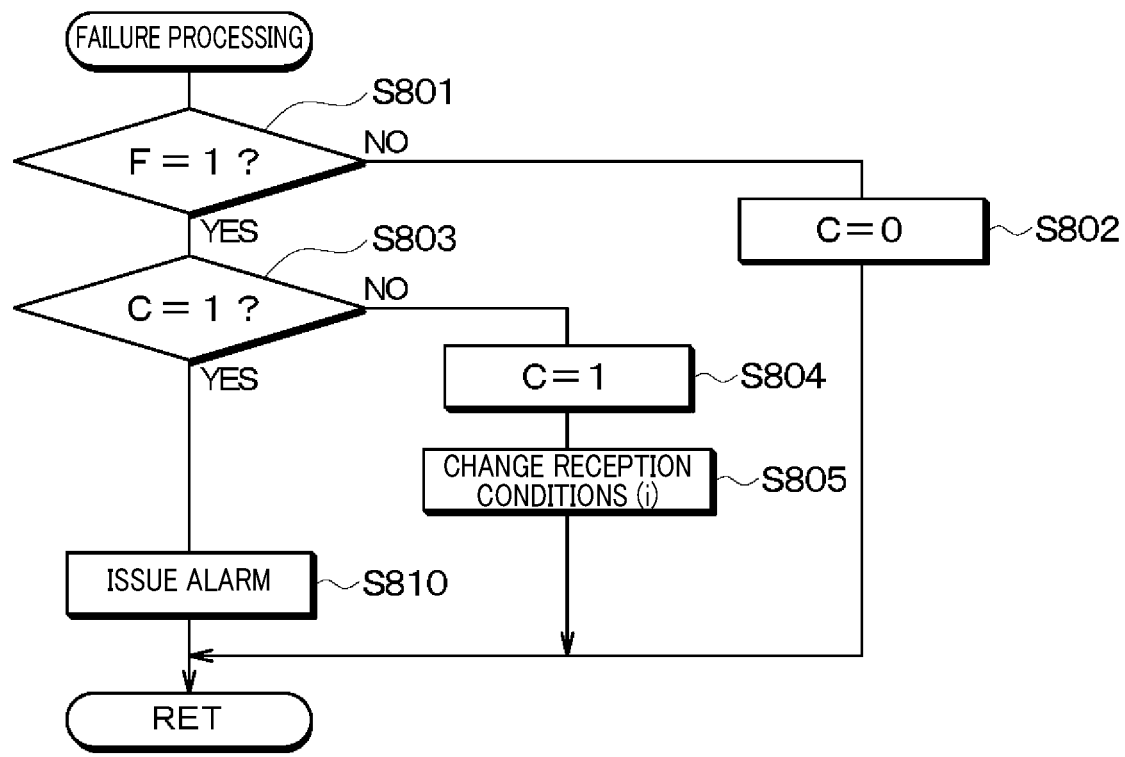
FIG. 8 is a flow diagram illustrating a fourth operation example of the object detection device illustrated in FIG. 1.

Upon start of the failure processing routine shown in FIG. 8, the CPU determines, at S801 first, whether the flag F has been set. If the flag F has been reset (i.e., NO at S801), the CPU allows control to proceed to S802. At S802, the CPU resets a counter C (i.e., C=0), and then temporarily terminates the present routine. The counter C indicates whether an accretion determination has been made since the adhesion determination mode was started.

If the flag F has been set (i.e., YES at S801), the CPU allows control to proceed to S803. At S803, the CPU determines whether the count of the counter C is 1. If the count of the counter C is 0 (i.e., NO at S803), the flag F is one that has been set during the execution of the adhesion detection routine immediately before startup of the failure processing routine of the present cycle. Specifically, this means that an accretion determination has provisionally been made for the specific sensor during the execution of the adhesion detection routine immediately before startup of the failure processing routine of the present cycle. Accordingly, the reception conditions for the specific sensor in question are changed to thereby execute the adhesion detection routine again. For this purpose, the CPU performs the processing of S804 and S805, and then temporarily terminates the present routine.

At S804, the CPU sets the count of the counter C to 1. At S805, the CPU changes the reception conditions for the specific sensor. Specifically, for example, the CPU increases the reception amplification factor of the specific sensor. Alternatively, for example, the CPU decreases the threshold intensity of the specific sensor.

Despite the provisional snow accretion determination having been made (i.e., the flag F having been set) for the specific sensor, and despite the reception conditions having been changed for the specific sensor, the provisional snow accretion determination (i.e., setting of the flag F) for the specific sensor may not necessarily be overturned. In this case, the processing in the flow diagram of FIG. 8 will be: YES at S801 and YES at S803. In this case, the CPU allows control to proceed to S810, and then temporarily terminates the present routine. At S810, the CPU controls the notification unit 27 so that the driver is notified of the occurrence of snow accretion. Specifically, the CPU formally determines whether snow accretion has occurred in the specific sensor.

As described above, preceding the notification unit 27 performing the notification process, the CPU in the present operation example changes the reception conditions for the specific sensor whose difference between the representative value and the minimum value is not less than the predetermined value. Furthermore, the CPU determines snow accretion as having occurred if the difference between the representative value and the minimum value is once again not less than the predetermined value under the changed reception conditions, and then allows the notification unit 27 to perform the notification process. Thus, reliability of snow accretion determination is improved according to the present operation example.

Fifth Operation Example

The present operation example is a modification of the fourth operation example. Specifically, in the present operation example, a notification process is prevented from being immediately executed by the notification unit 27 if the flag F has been set for any one of the ultrasonic sensors 21 to 24 (termed a specific sensor hereinafter in the present operation example). In this case, in the present operation example, the specific sensor is permitted to operate in a transmission and reception mode, and the received noise level is monitored. Specifically, in the present operation example, the object detection device 20 allows the specific sensor, for which the occurrence of snow accretion has been determined, to transmit search waves and receive waves. Based on the reception conditions of when performing transmission of search waves and reception, snow accretion is determined to have occurred.

Details of the present operation example will be described. Upon start of the adhesion determination mode, the CPU iterates a first adhesion detection routine shown in FIG. 9, a second adhesion detection routine shown in FIG. 10, and the failure processing routine shown in FIG. 4 at respective predetermined cycles.

Figure 9:
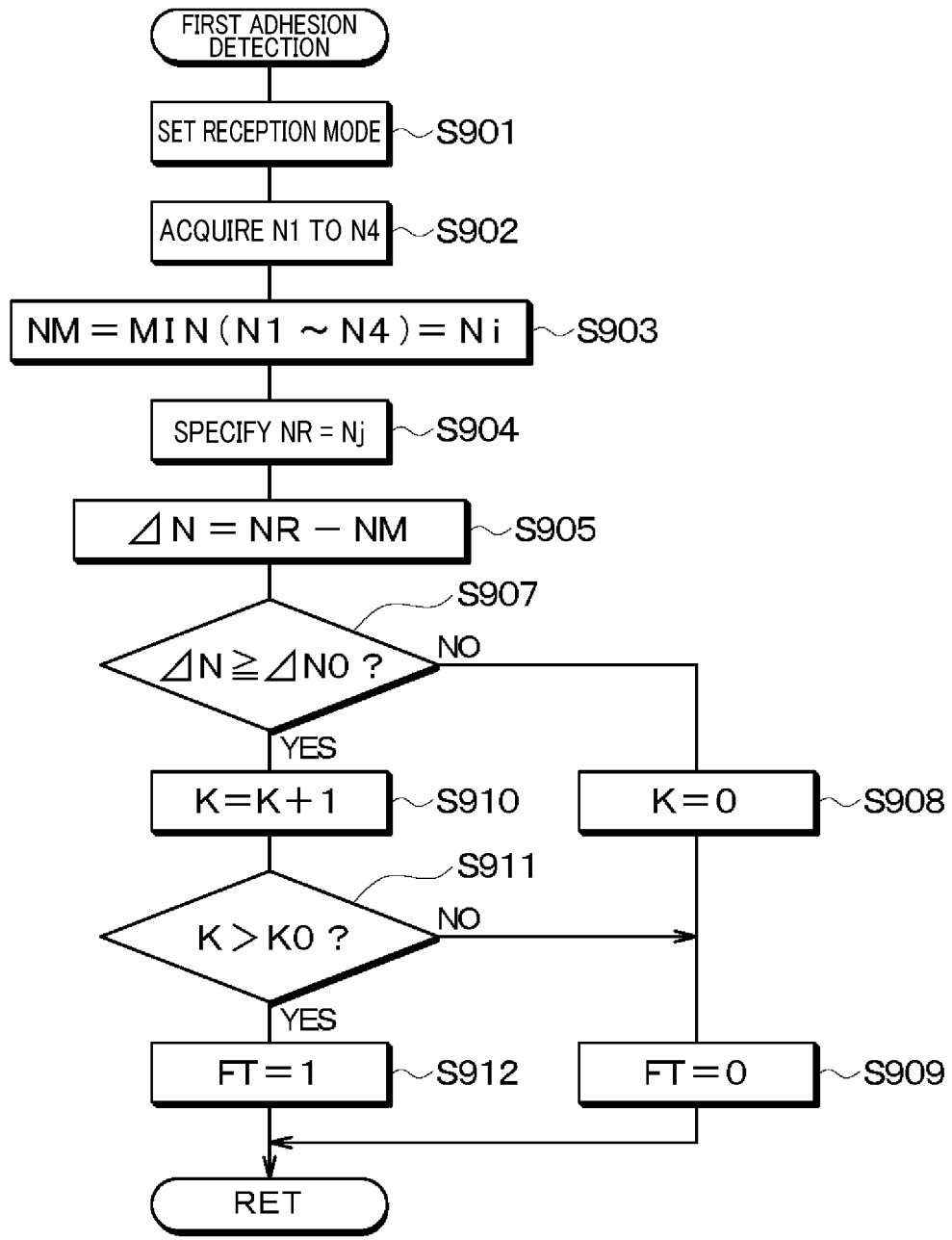
FIG. 9 is a flow diagram illustrating a fifth operation example of the object detection device illustrated in FIG. 1.

Upon start of the first adhesion detection routine shown in FIG. 9, the CPU sets, at S901 first, the operation mode of the ultrasonic sensors 21 to 24 to a reception mode. Then, at S902, the CPU acquires counts N1 to N4.

At subsequent S903, the CPU specifies a minimum value NM from among the counts N1 to N4. Also, at S903, the CPU specifies the value of i for minimum value NM=Ni (i is any one of integers 1 to 4), and stores the value in the RAM.

At the subsequent S904, the CPU specifies a secondly small value from among the counts N1 to N4 as a representative value NR. Further, at S904, the CPU specifies the value of j for representative value NR=Nj (j is any one of integers 1 to 4, however i≠j), and stores the value in the RAM. After that, the CPU calculates, at S905, a difference ΔN between the representative value NR and the minimum value NM, and then allows control to proceed to S907.

At S907, the CPU determines whether ΔN is not less than a predetermined value ΔN0. If ΔN is less than the predetermined value ΔN0 (i.e., NO at S907), the CPU allows control to proceed to S908 and S909, and then temporarily terminates the present routine. At S908, the CPU resets the counter K (i.e., K=0). At S909, the CPU resets a flag FT (i.e., F=0). The flag FT serves as a provisional diagnosis flag and thus indicates a provisional determination as to whether snow accretion has occurred.

If ΔN is not less than the predetermined value ΔN0 (i.e., YES at S907), the CPU allows control to proceed to S910 and S911. At S910, the CPU increments the counter K by 1. At S911, the CPU determines whether the count of the counter K has exceeded a predetermined value K0. If the count of the counter K has exceeded a predetermined value K0 (i.e., YES at S911), the CPU allows control to proceed to S912, and then temporarily terminates the present routine. At S912, the CPU sets the flag FT (i.e., FT=1). If the count of the counter K has not exceeded the predetermined value K0 (i.e., NO at S911), the CPU allows control to proceed to S909. At S909, the CPU resets the flag FT, and then temporarily terminates the present routine.

Figure 10:
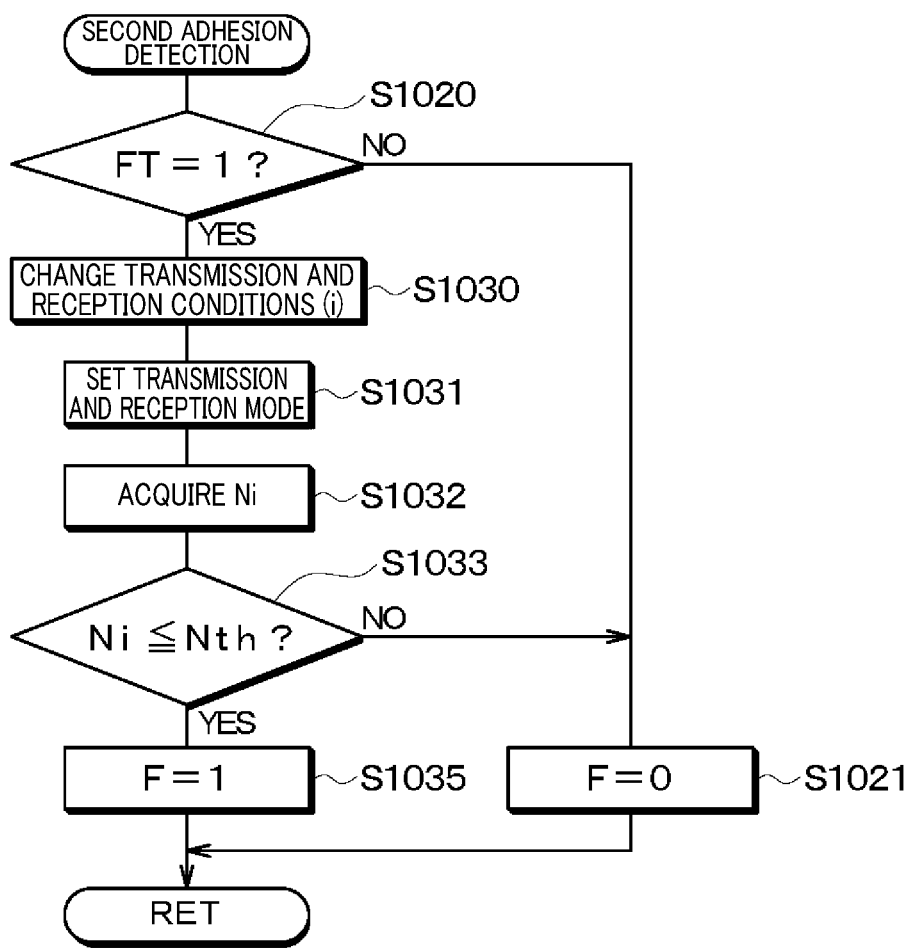
FIG. 10 is a flow diagram illustrating a fifth operation example of the object detection device illustrated in FIG. 1.

Upon start of the second adhesion detection routine shown in FIG. 10, the CPU determines, at S1020 first, whether the flag FT has been set. If the flag FT has been reset (i.e., NO at S1020), the CPU allows control to proceed to S1021. At S1021, the CPU resets the flag F (i.e., F=0), and then temporarily terminates the present routine.

If the flag FT has been set (i.e., YES at S1020), the CPU allows control to proceed to S1030. At S1030, the CPU sets transmission and reception conditions for the specific sensor so that sensitivity of receiving waves is increased more than in the state of transmitting waves for detection of approach of an object during traveling at a speed of less than a predetermined speed (termed a normal transmission and reception state hereinafter). Specifically, for example, the CPU increases the reception amplification factor of the specific sensor more than in the normal transmission and reception state. Alternatively, for example, the CPU may decrease the threshold intensity of the specific sensor more than in the normal transmission and reception state. Alternatively, for example, the CPU may increase the output of search waves of the specific sensor more than in the normal transmission and reception state. Alternatively, for example, the CPU may perform two or all of reception amplification factor increase, threshold intensity decrease, and search wave output increase.

After setting the transmission and reception conditions for the specific sensor as described above, the CPU allows control to proceed to S1032 and S1033. At S1032, the CPU acquires a count Ni of the specific sensor, based on the transmission and reception of the present cycle. At S1033, the CPU determines whether the count Ni acquired at S1032 is not more than a predetermined count Nth.

If the count Ni of the present cycle exceeds the predetermined count Nth (i.e., NO at S1033), the CPU allows control to proceed to S1021. At S1021, the CPU resets the flag F (i.e., F=0), and then temporarily terminates the present routine. If the count Ni of the present cycle is not more than the predetermined count Nth (i.e., YES at S1033), the CPU allows control to proceed to S1035. At S1035, the CPU sets the flag F (i.e., F=1), and then temporarily terminates the present routine.

As described above, the CPU of the present operation example allows the specific sensor to transmit search waves if the difference between the representative value and the minimum value is not less than the predetermined value. In this case, the CPU sets transmission and reception conditions for the specific sensor so that the sensitivity of receiving waves is increased more than in the normal transmission and reception state. Furthermore, the CPU determines snow accretion as having occurred in the specific sensor, if the frequency of receiving waves with an intensity of not less than the threshold intensity is equal to or less than the predetermined frequency in the specific sensor after transmission of search waves. Thus, reliability of snow accretion determination is improved according to the present operation example.

(Modifications)

The present disclosure should not be limited to the embodiment described above. The embodiment described above can be appropriately modified. Typical modifications will be described below. The following modifications will be described focusing on only the differences from the embodiment described above.

The present disclosure should not be limited to the specific device configuration shown in the embodiment described above. Specifically, for example, the vehicle 10 should not be limited to a four-wheel vehicle. Specifically, the vehicle 10 may be a three-wheel vehicle, or may be a six- or eight-wheel vehicle, such as a cargo truck.

The ultrasonic sensors 21 to 24 should also not be particularly limited. For example, the mounting level and/or the mounting elevation angle may be the same or different between the ultrasonic sensors 21 and 22. The same applies to the ultrasonic sensors 23 and 24. Some of the ultrasonic sensors 21 to 24 may be provided to the front grille 13. In addition to the ultrasonic sensors 21 to 24, other ultrasonic sensors may be provided to the front bumper 12 and/or the front grille 13. In addition to the ultrasonic sensors 21 to 24, other ultrasonic sensors may be provided to the rear part (e.g., rear bumper) of the vehicle body 11. The additional ultrasonic sensors should be included in the objects to be processed (i.e., objects for which show accretion determination is made) in the individual operation examples.

In the embodiment described above, the ECU 26 is configured to allow the CPU to read a program such as from the ROM for the startup. However, the preset disclosure should not be limited to such a configuration. Specifically, for example, the ECU 26 may be a digital circuit configured to enable the operation described above. For example, the ECU 26 may be an ASIC, such as a gate array. ASIC stands for application specific integrated circuit.

The present disclosure should not be limited to the specific operation examples and processing modes shown in the embodiment described above. For example, the representative value NR of FIG. 3 may be a maximum value among the counts N1 to N4, or may be a secondly large value among the counts N1 to N4. Alternatively, the representative value NR of FIG. 3 may be a value as a result of appropriately statistically processing the values of the counts N1 to N4 excluding the minimum value. The statistical processing in this case may be a simple arithmetic average, or may be a weighted average considering the mounting conditions. The same applies to FIGS. 6, 7 and 9.

The setting of the predetermined value ΔN0 based on the lookup table ΔN0 (i, j) performed at S606 may be performed between S705 and S707 in the adhesion detection routine shown in FIG. 7. Similarly, setting of such a predetermined value ΔN0 may be performed between S905 and S907 in the first adhesion detection routine shown in FIG. 9.

In the fifth operation example, the processing at S805 may be omitted. Specifically, the CPU in this modification may allow the specific sensor to transmit search waves if the difference between the representative value and the minimum value is not less than the predetermined value. In this case, the CPU may set transmission and reception conditions for the specific sensor so as to be similar to those in the normal transmission and reception state. Furthermore, the CPU may determine snow accretion as having occurred in the specific sensor, if the frequency of receiving waves with an intensity of not less than the threshold intensity is equal to or less than the predetermined frequency in the specific sensor after transmission of search waves. Thus, reliability of snow accretion determination may be improved according to the present operation example.

The inequality sign in each determination process may or may not include an equality sign. Specifically, for example, in place of the expression "not less than ΔN0", an expression "exceeding ΔN0" may be used. The expression "not less than a threshold intensity" may be changed to an expression "exceeding a threshold intensity".

The operation examples may be appropriately used in combination. Specifically, for example, the targets for acquiring counts at S302 in the first operation example shown in FIG. 3 may be limited, as in the second operation example shown in FIG. 5, to ones having a difference in horizontal mounting angle in a predetermined angle range, among the ultrasonic sensors 21 to 24. The same applies to S702 in the fourth operation example shown in FIG. 7, and S902 in the fifth operation example show in FIG. 9.

Modifications should not also be limited to ones set forth above. A plurality of modifications may be combined with each other. Furthermore, all or part of the embodiment described above may be combined with all or part of the modifications.

The invention claimed is:

1. An object detection device installed in a vehicle, comprising:
 a plurality of ultrasonic sensors disposed being exposed at an outer surface of the vehicle so that ultrasonic waves, as search waves, are transmitted to the outside of the vehicle, and waves, including reflected waves of the search waves, are received; and
 a control unit controlling transmission and non-transmission of the search waves by each of the plurality of ultrasonic sensors, and electrically connected to each of the plurality of ultrasonic sensors so as to detect approach of an object to the vehicle, based on the waves received by each of the plurality of ultrasonic sensors, wherein
 the control unit is configured to:
  start an adhesion determination mode that determines whether snow accretion has occurred on each of the plurality of ultrasonic sensors when the vehicle travels at a speed equal to or higher than a predetermined speed; and
 in the adhesion determination mode, the control unit is configured to:
  stop transmission of the search waves by each of the plurality of ultrasonic sensors;
  count a number of times the waves are received having an intensity of not less than a threshold intensity while transmission of the search waves is stopped for each of the plurality of ultrasonic sensors, the threshold intensity being a predetermined threshold that indicates noise detected by each of the plurality of ultrasonic sensors, the noise generated by each of the plurality of ultrasonic sensors as the vehicle travels;
  acquire a first count that is a count value of the number of times the received waves in a first sensor that is one of the plurality of ultrasonic sensors, and a second count that is a count value of the number of times the received waves in a second sensor different from the first sensor, among the plurality of ultrasonic sensors; and
  determine that snow accretion has occurred on the first sensor if the first count is smaller than the second count, and a difference between the first count and a representative value that is set based on the second count is not less than a predetermined value.

2. The object detection device according to claim 1, wherein the plurality of ultrasonic sensors are disposed on a front face of the vehicle.

3. The object detection device according to claim 1, wherein, defining an angle of a directional center axis of each of the ultrasonic sensors relative to a vehicle center line in plan view to be a horizontal mounting angle, a difference between the horizontal mounting angle of the first sensor and the horizontal mounting angle of the second sensor is not more than a predetermined angle.

4. The object detection device according to claim 1, wherein, defining an angle of a directional center axis of each of the ultrasonic sensors relative to a vehicle center line in plan view to be a horizontal mounting angle, a difference between the horizontal mounting angle of the first sensor and the horizontal mounting angle of the second sensor is not less than a predetermined angle.

5. The object detection device according to claim 1, wherein the control unit is configured to set the predetermined value according to a difference in mounting conditions between the first sensor and the second sensor.

6. The object detection device according to claim 1, wherein:
in the adhesion determination mode, the control unit is configured to:
change reception conditions for receiving the waves in the first sensor if the first count is smaller than the second count, and the difference between the representative value and the first count is not less than the predetermined value; and
determine that snow accretion occurred on the first sensor if the first count is smaller than the second count, and the difference between the representative value and the first count is not less than the predetermined value under the changed reception conditions.

7. The object detection device according to claim 1, wherein in the adhesion determination mode, the control unit is configured to:
allow the first sensor to transmit search waves if the first count is smaller than the second count, and the difference between the representative value and the first count is not less than the predetermined value; and
determine that snow accretion has occurred on the first sensor if a number of times the waves are received having an intensity of not less than a threshold intensity is not more than predetermined number of times in the first sensor after transmission of the search waves.

8. The object detection device according to claim 7, wherein:
in the adhesion determination mode, the control unit is configured to allow the first sensor to transmit search waves under conditions that sensitivity of receiving the waves increases more than when transmitting the search waves for detection of the approach of an object while the vehicle travels at the speed less than the predetermined speed.

9. The object detection device according to claim 1, wherein the device further comprises a notification unit that issues an alarm about occurrence of a failure if snow accretion is determined to have occurred in the first sensor.

* * * * *